Patented Aug. 22, 1939

2,170,273

UNITED STATES PATENT OFFICE 2,170,273

ADHESIVE COMPOSITION

Willard L. Morgan, Calumet City, Ill., assignor to American Maize-Products Company, a corporation of Maine No Drawing. Application December 14, 1937, Serial No. 179,663

6 Claims. (Cl. 134—23.8)

My invention relates to adhesive compositions and more particularly to a protein adhesive composition that contains an improved substance for rendering and maintaining the protein soft and flexible during its entire use.

In the many uses of glue, casein, and other water soluble proteins as adhesives the adhesive film oftentimes dries too hard and brittle for satisfactory use. Thus, in gluing together papers, cloth, or cork particles into sheets, flexibility is highly desirable and glycerine or glycol have been used in the adhesive to impart flexibility. However, these materials are now relatively expensive and for that reason their use is limited. Sugar solutions have also been tried for this purpose but have been found generally undesirable due to stickiness.

Various hygroscopic salts, such as calcium chloride and sodium lactate, have been suggested as softening agents for adhesives since they absorb moisture from the atmosphere and thereby tend to keep the adhesive film soft during its use. Unfortunately, such salt type substances have a precipitating action on the proteins so that in certain proportions they will not mix properly. Thus as a glue film containing sodium lactate dries, with corresponding changes in concentration, it goes through a white blushed stage and may dry in that form. Tests show that because of this salting out action the gel or adhesive strength of the glue is decreased. These undesirable effects have limited the use of sodium lactate as a substitute for glycerine in the flexible glue field.

An object of my invention is to provide an adhesive composition having an improved agent therein that maintains the composition soft and flexible without causing any adverse effects.

In accordance with my invention I have discovered that a number of the aliphatic alkylolamine lactates may be incorporated in adhesive compositions to provide and maintain certain optimum characteristics in the composition, particularly flexibility, and wthout incurring the general defects and limitations of the prior art compositions. Examples of the alkylolamine lactates that I have found to be advantageous in use are mono, di and tri ethanolamine and propanolamine lactates. They mix readily and completely with glue or other aqueous solutions of proteins, such as casein or albumins. They do not affect the gel or adhesive strength when used in the usual quantities and the dried adhesive films are clear, transparent, supple, and flexible and remain so due to the hygroscopic action of the alkylolamine lactates.

The alkylolamine lactates useful in my invention may be prepared by mixing lactic acid and the desired alkylolamine in molecular quantities. These lactates are less expensive than the glycerine and glycol commonly used and are more effective in that they do not permit the adhesive film to dry out and become hard and brittle.

Illustrative but non-limiting examples of the adhesive compositions of my invention are as follows:

Example I

|   | Parts |
|---|---|
| Glue | 1 |
| Triethanolamine lactate | 1–2 |

The composition in this example is particularly suitable as a casting material for printers rollers.

Example II

|   | Pounds |
|---|---|
| Casein | 100 |
| Borax | 20 |
| Monoethanolamine lactate | 20 |

Example III

|   | Pounds |
|---|---|
| Gelatine | 100 |
| Diethanolamine lactate | 15 |

In Examples 2 and 3 sufficient water is added to give the adhesive the desired consistency.

The term "water soluble" as used in the claims herein is intended to cover the water soluble and substantially water soluble alkylolamine lactates and adhesive proteins, for example, glue, that upon the addition of water, particularly hot water, will dissolve or disperse to form a soft, viscous or plastic, adhesive mass, such mass being adapted to be used as an adhesive in the usual manner for gluing together pieces of paper, cloth, cork and the like and will form upon drying a permanently soft flexible adhesive coating. This type of substantially water soluble protein adhesive is distinct from the prolamins which are not soluble in water and do not form an adhesive or glue like material upon the addition of water.

It will be understood that various modifications and changes may be made in the foregoing description without departing from the scope of my invention, some of the novel features of which are defined in the appended claims:

I claim:

1. A liquid water soluble protein adhesive composition comprising an aqueous solution of a water soluble adhesive protein and a water soluble aliphatic alkylolamine lactate, the latter imparting to a coating made from the adhesive composition softness and flexibility.

2. A liquid water soluble protein adhesive composition as defined in claim 1, in which the adhesive material is an aqueous casein solution containing casein and borax.

3. A liquid water soluble protein adhesive composition as defined in claim 1, in which the adhesive material is an aqueous solution of albumen glue.

4. A liquid water soluble protein adhesive composition as defined in claim 1, in which the alkylolamine lactate is a propanolamine lactate.

5. A liquid water soluble protein adhesive composition as defined in claim 1, in which the alkylolamine lactate is a monoethanolamine lactate.

6. A liquid water soluble protein adhesive composition as defined in claim 1, in which the alkylolamine lactate is an ethanolamine lactate containing at least two ethanol groups.

WILLARD L. MORGAN.